No. 765,346. PATENTED JULY 19, 1904.
C. F. SMITH.
REVERSING MECHANISM.
APPLICATION FILED SEPT. 11, 1903.
NO MODEL.

Witnesses:
Jas. L. Maloney.
Nancy P. Ford.

Inventor,
Charles F. Smith,
by J. P. & H. J. Livermore
Att'ys

No. 765,346.                                          Patented July 19, 1904.

UNITED STATES PATENT OFFICE.

CHARLES F. SMITH, OF MELROSE, MASSACHUSETTS, ASSIGNOR TO SMITH SINGLE BELT REVERSING COUNTERSHAFT COMPANY, A CORPORATION OF MAINE.

REVERSING MECHANISM.

SPECIFICATION forming part of Letters Patent No. 765,346, dated July 19, 1904.

Application filed September 11, 1903. Serial No. 172,770. (No model.)

*To all whom it may concern:*

Be it known that I, CHARLES F. SMITH, of Melrose, county of Middlesex, and State of Massachusetts, have invented an Improvement in Reversing Mechanism, of which the following description, in connection with the accompanying drawings, is a specification, like letters on the drawings representing like parts.

The present invention relates to a reversing mechanism, and is adapted to be used, for example, in connection with lathe counter-shafts and the like, the invention mainly relating to novel details of construction and arrangement whereby the structure is made more durable and efficient.

The invention is embodied in a reversing mechanism of that type in which a pulley loosely mounted on a shaft is capable of being clutched to the shaft to drive the same in the direction of rotation of the pulley or to act upon intermediate gears when not clutched to the shaft, the bearing for said intermediate gears being at such time held stationary and the gears in mesh with a gear on the shaft, so that the said shaft is rotated in the opposite direction through the action of the gears.

Figure 1:
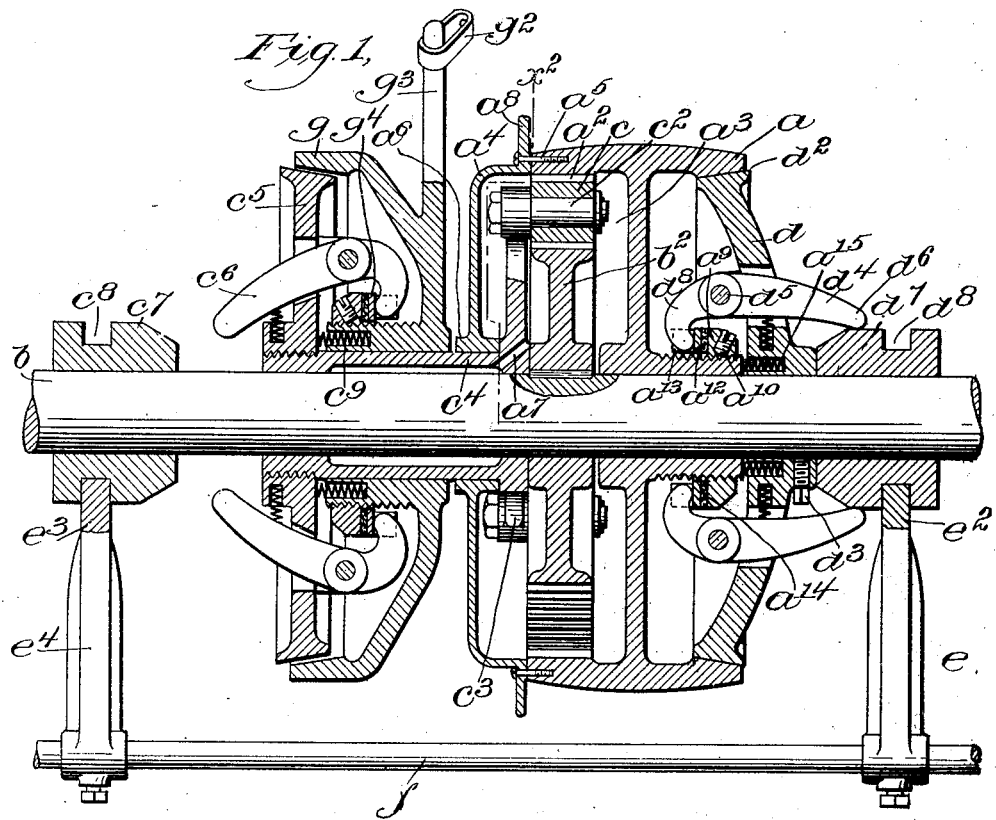
Figure 2:
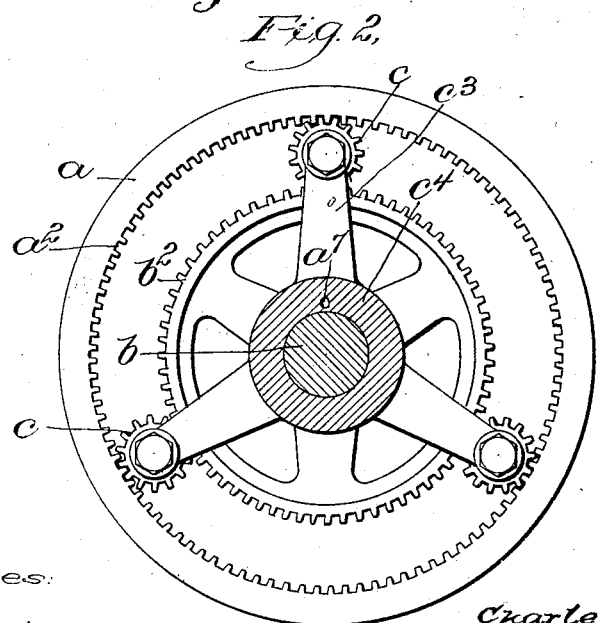

Figure 1 is a horizontal section of a reversing mechanism embodying the invention, and Fig. 2 is a transverse section on the line $x^2$ of Fig. 1.

In a reversing-gear of the type in which the present invention is embodied the pulley $a$ has a bearing upon the shaft $b$ and is normally free to rotate upon said shaft, being further arranged to be clutched to the said shaft when it is desired to have the shaft driven in the direction of rotation of the pulley.

The shaft $b$ is provided with a gear $b^2$, fixed thereon, while the pulley $a$ has an internal gear $a^2$, there being one or more intermediate gears $c$ interposed between the gear $b^2$ and the gear $a^2$, the said gear or gears $c$ being connected with a member which is capable of being held stationary when it is desired to reverse the shaft, so that the bearings for the gears will stand still, causing the rotation of the pulley to be transmitted through the intermediate gears to the gear $b^2$, thereby causing the shaft $b$ to rotate in a direction opposite to that of the pulley.

In the construction herein shown as embodying the invention the bearings for the gears $c$, three of which are preferably employed, consist of pins $c^2$, projecting laterally from the arm $c^3$ of a spider which has a hub or sleeve $c^4$ bearing upon the shaft, so that if the spider is held stationary the shaft is free to rotate with relation thereto.

The pulley $a$ is provided with a chamber $a^3$, which incloses all the gears, the web and the peripherial portion or rim of the pulley forming part of the walls of said chamber, which is completed or closed in by a cover or inclosing member $a^4$, secured, as by bolts $a^5$, along the periphery of the pulley and having a hub portion $a^6$, which bears upon the sleeve $c^4$. This chamber forms a reservoir for lubricant which keeps the gears running easily and without noise, at the same time working out between the hub of the pulley and the shaft to make said parts run easily when the shaft is being reversed, the said chamber also having an outlet-passage $a^7$ leading to the space between the sleeve $c^4$ and the shaft to supply these bearing-surfaces with lubricant, and thereby reduce friction when the sleeve $c^4$ is locked and the shaft is rotating in the reverse direction to that of the pulley. The member $a^4$ is further provided with a flange $a^8$, which prevents the belt from slipping off the pulley at the side nearest to the stationary member to which the sleeve $c^4$ is clutched when the pulley is being reversed, thereby preventing damage which might accidentally ensue if the belt slipped and became jammed between these parts.

In order to afford efficient clutching means both for the pulley and for the sleeve $c^4$, I employ disks of considerable size having tapered frictional engaging portions which coöperate with annular tapered engaging portions, the said parts being arranged to be forced into frictional engagement with each other. The clutch for the pulley consists of a disk $d$, having a tapered surface $d^2$ to coöperate with an annular tapered surface formed along the under side of the peripheral part of the pulley, said disk being secured to the shaft by any suitable or usual device, such as a set-screw $d^3$. The pulley is free to move to a slight extent longitudinally along the shaft, the movement being limited by the gear $b^2$, which stands between the hub portion $a^6$ and the main hub portion of the pulley, the hub $c^4$ being between the hub $a^6$ and the gear $b^2$. The pulley therefore may be drawn along the shaft until it is forced into engagement with the disk $d$, the said disk being provided for this purpose with levers $d^4$, which are pivoted at $d^5$ in the disk, the said levers each having one end $d^6$, which is acted upon by a cone $d^7$, while the opposite ends $d^8$ of the levers coöperate with an adjustable shoulder on the hub of the pulley.

As herein shown, the main portion of the adjustable shoulder consists of a collar $a^9$, screw-threaded upon the hub of the pulley and held in its adjusted position by means of a set-screw $a^{10}$, the said shoulder forming an abutment for a hardened washer $a^{12}$, having lugs or projections $a^{13}$, between which rest the ends $d^8$ of the levers, there being a second washer $a^{14}$, preferably of fiber, interposed between the washer $a^{13}$ and the collar $a^9$. This construction prevents the washer $a^{12}$ from turning with relation to the levers and through the intermediate washer $a^{14}$, distributes the pressure, the said washer $a^{14}$ further constituting a wearing-surface when the pulley is rotating in a direction opposite to that of the shaft or rotating free on the shaft, so that the ends of the levers and the part against which they bear will not become worn in case there is a rubbing contact.

The cone $d^7$ is shown as sleeved upon the shaft and provided with an annular channel $d^8$ to receive the forked portion $e^2$ of an arm $e$, which is mounted on a shipper-rod $f$, adapted to be moved longitudinally in any suitable or usual way. When the said rod $f$ has been moved to the left, as shown in Fig. 1 of the drawings, the levers $d^4$ will have been rocked on their pivots, forcing the pulley into engagement with the disk $d$, so that the disk, shaft, and pulley all rotate together in the same direction.

In order to reverse the shaft, the intermediate gears are arranged to be locked stationary with relation to the shaft, the hub $c^4$ of the intermediate gear-spider being provided with a disk $c^5$, provided with levers $c^6$, which coöperate with a cone $c^7$, which is similar in construction to the cone $d^7$, previously described, having a channel $c^8$, which is acted upon by the forked extremity $e^3$ of an arm $e^4$ on the rod $f$.

The disk $c^5$, which has a conical tapered surface like that of the disk $d$, is arranged to be engaged by a coöperating clutch member $g$, which is mounted on the hub or sleeve $c^4$ so as to be movable longitudinally thereon and prevented from rotation by means of a strap or fastening device $g^2$, coöperating with an arm $g^3$, connected with the clutch member $g$, the said strap being loose or flexible, so as to admit of the longitudinal movement of the member $g$, at the same time preventing the rotation thereof.

The member $g$ is provided with an abutment or shoulder $g^4$, the construction of which is the same as that of the abutment on the pulley-hub, therefore needing no further detailed description.

The levers $c^6$ when acted upon by the cone $c^7$ force the member $g$ into engagement with the disk $c^5$. This locks the spider carrying the intermediate gears, and the rotation of the pulley is thus transmitted through said intermediate gears to the gear $b^2$, causing the reverse movement of the shaft. The intermediate gears may be constructed and arranged in any suitable or usual way to compensate for equalizing or varying the relative speeds of the forward and reverse movements, said gears being herein shown as simple gears interposed directly between the gears $a^2$ and $b^2$, thereby causing the reverse movement of the shaft to be at a speed slightly greater than that of the forward movement.

As has been stated, the arms $e$ and $e^4$ are preferably mounted upon a single shipper-rod $f$, so that a movement of said rod in the direction to operate one clutching device results in the disengagement of the other, it being thus impossible to operate both clutches at once, the pulley always being free to rotate on the shaft when the gears are locked, and vice versa, there being, however, sufficient space between the cones to admit of an intermediate position in which the pulley is free to rotate idly.

To disengage the clutch members, springs $a^{15}$ and $c^9$ are interposed, respectively, between the disk $d$ and the hub of the pulley and between the disk $c^5$ and the hub of the clutch member $g$, the said springs being contained in bores in one part or the other, so as to be held in position. These springs are strong enough to insure the immediate freeing of the clutch parts as soon as the levers are released.

I claim—

1. In a reversing mechanism, the combination with a shaft; of a gear secured on said shaft; a friction-disk also secured on said shaft; a sleeve mounted on said shaft; one or more intermediate gears mounted on said sleeve; a friction-disk also mounted on said sleeve; a coöperating friction-disk longitudinally movable upon said sleeve, but prevented from rotation therewith; said disks constituting clutch members; a pulley having a bearing on the shaft and being provided with internal gear-teeth intermeshing with the intermediate gears aforesaid, said pulley being also provided with a frictional engaging surface to cooperate with the friction-disk on the shaft, said pulley and disk constituting clutch members; and actuating devices coöperating respectively with the movable clutch members, substantially as described.

2. In a reversing mechanism, the combination with the shaft; of a friction-disk fixed thereon; one or more levers pivotally connected with said disk; a pulley having a bearing on the said shaft and being provided with an internal gear; an adjustable engaging member mounted on the hub of said pulley and provided with a washer to engage the ends of said levers and a second washer interposed between said washer and the body of the adjustable engaging member; means for rocking said levers on their pivots to draw the pulley into engagement with the disk; a sleeve mounted on the shaft; a gear mounted on the shaft; intermediate gears mounted on said sleeve and intermeshing with the gear on the shaft and the internal gear-teeth on the pulley; and means for preventing the said sleeve from rotating with the shaft, as set forth.

3. The combination with a shaft; of a gear fixed thereon; a sleeve loose on the shaft; one or more gears carried by said sleeve in mesh with the gear on the shaft; a friction-disk fast on said sleeve; a coöperating friction-disk loose on said sleeve and held stationary with relation thereto so far as relates to rotary movement; a disk fixed on the shaft; a pulley having a hub portion loose on the shaft, said hub portion being located between the gear on the shaft and the friction-disk on the shaft; internal gear-teeth, and a frictional engaging surface formed on the pulley to coöperate respectively with the gears on the sleeve and the friction-disk on the shaft; an inclosing case or cover secured to the pulley and having a bearing on the sleeve on the shaft, said inclosing case forming with the pulley a chamber for lubricant, which chamber is provided with an outlet leading to the shaft within the sleeve thereon; and means for bringing the friction-disks and their engaging members into frictional engagement, as set forth.

In testimony whereof I have signed my name to this specification in the presence of two subscribing witnesses.

CHARLES F. SMITH.

Witnesses:
NANCY P. FORD,
HENRY J. LIVERMORE.